Patented Sept. 4, 1951

2,566,810

UNITED STATES PATENT OFFICE 2,566,810

SULFOACETIC ACID ANHYDRIDES AND METHODS FOR THEIR PREPARATION

Curtis W. Smith, Berkeley, Calif., assignor to Shell Development Company, San Francisco, Calif., a corporation of Delaware No Drawing. Application April 26, 1950, Serial No. 158,340

5 Claims. (Cl. 260—327)

This invention relates to the preparation of inner anhydrides of sulfoacetic acid and its derivatives, the said anhydrides being four-membered ring compounds of the general formula,

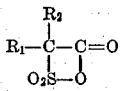

where $R_1$ and $R_2$ are hydrogen atoms or various substituent radicals.

It is my discovery that acid anhydrides of the foregoing variety can be prepared by reacting sulfur trioxide with a ketene, the reaction going forward in an efficient manner whenever the reactants are brought together in an anhydrous solvent medium.

Ketenes are a special class of ketones which undergo many reactions that are non-analogous to those of the general class of carbonyl compounds, which reactions are due to the presence of the structural arrangement $>C=C=O$ in the ketene molecule. They may be represented by the general formula $$\begin{matrix} R_1 \\ \phantom{R}\diagdown \\ \phantom{RRR}C=C=O \\ \phantom{R}\diagup \\ R_2 \end{matrix}$$

wherein the expressions $R_1$ and $R_2$, which may be the same or different, represent members selected from the group consisting of the hydrogen atom and the various alkyl, aryl, aralkyl, alkaryl and cycloparaffinic radicals. When both $R_1$ and $R_2$ are hydrogen the compound is ketene itself ($CH_2=C=O$). When only one of the R's is hydrogen, the compound is classified as an aldoketene, whereas if neither of the R's is hydrogen the compound is a ketoketene. While the invention will be generally described and illustrated hereinafter with particular reference to ketene itself (since it is the preferred reactant of the general ketene class), nevertheless, other ketenes may be employed provided the structural arrangement $>C=C=O$ contains the only aliphatic multiple linkage in the compounds. Illustrative examples of particular ketenes suitable for employment in the present invention include ketene, methylketene, ethylketene, methylbutylketene, ethylisopropylketene, amylketene, diheptylketene, ethylcyclohexyl ketoketene, bis(trimethylcyclohexyl) ketene, phenylcyclohexyl ketoketene, dimethylphenyl aldoketene, decylphenyl ketoketene, phenylketene, benzylketene, diphenylketene, methylphenylketene, and dibenzylketene.

The reaction of the present invention may be illustrated by the following general equation:

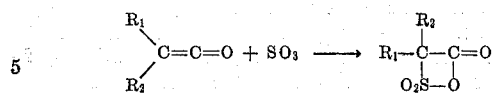

As noted above, when $R_1$ and $R_2$ are hydrogen atoms, the one reactant is ketene itself and the product is the (inner) anhydride of sulfoacetic acid. Other reactions which are illustrative of the invention are presented in the following table wherein there is indicated the particular anhydride derived by reacting sulfur trioxide with the indicated ketene derivative starting material:

Table

| | Ketene Reactant | Acid Anhydride Product |
|---|---|---|
| 1 | Methylketene | Inner anhydride of alpha-sulfopropionic acid. |
| 2 | Ethylketene | Inner anhydride of alpha-sulfobutyric acid. |
| 3 | Phenylketene | Inner anhydride of phenylsulfoacetic acid. |
| 4 | Benzylketene | Inner anhydride of alpha-sulfo-beta-phenyl-propionic acid. |
| 5 | Methylbutylketene | Inner anhydride of alpha-methyl-alpha-sulfo-hexanoic acid. |
| 6 | Amylketene | Inner anhydride of alpha-sulfoheptanoic acid. |
| 7 | Ethylcyclohexyl ketoketene. | Inner anhydride of alpha-cyclohexyl-alpha-sulfobutanoic acid. |
| 8 | Diphenylketene | Inner anhydride of diphenylsulfoacetic acid. |
| 9 | Methylphenylketene | Inner anhydride of alpha-phenyl-alpha-sulfopropionic acid. |
| 10 | Dibenzylketene | Inner anhydride of alpha-benzyl-alpha-sulfo-beta-phenylpropionic acid. |
| 11 | Phenylcyclohexyl ketoketene. | Inner anhydride of phenylcyclohexyl sulfoacetic acid. |
| 12 | Dimethylphenyl aldoketene. | Inner anhydride of (dimethyl) phenylsulfoacetic acid. |
| 13 | Dicyclohexyl ketoketene. | Inner anydride of dicyclohexyl sulfoacetic acid. |

The method of this invention is conducted by bringing the ketene into reactive engagement with the sulfur trioxide in a liquid such as dioxane, pyridine, (liquid) sulfur dioxide, carbon tetrachloride, chloroform or the like, which is inert under the reaction conditions employed and has the ability to dissolve or otherwise retain the ketene and sulfur trioxide reactants. In some cases, as with dioxane, for example, the solvent forms a loose molecular combination, or adduct with the sulfur trioxide, though in such cases the sulfur trioxide is readily released to the ketene reactant. The reaction proceeds in the absence of a catalyst and at temperatures preferably below 50° C. Higher temperatures should be avoided whenever possible since considerable charring of the product ensues as reaction temperatures substantially in excess of 50° C. are employed. The reaction pressure is not critical and good results are obtanied using subatmospheric, atmospheric or superatmospheric pressures.

The respective ketene and sulfur trioxide reactants combine in equimolar proportions, and it is therefore preferable to so proportion the reactants, though good results are also obtained when either reactant is used in excess. Since ketene and various others of the ketene reactants are gases at room temperatures and above, the normal practice is first to form a solution of the sulfur trioxide in an appropriate solvent and then to bubble the ketene into this solution, preferably with cooling since the reaction is exothermic in character. The rate of ketene addition is not critical, it being satisfactory in most instances to add the same at a rate of from about 0.1 to 1 mole per hour, per mole of sulfur trioxide present.

Whatever the nature of the solvent, the reactants and the reaction conditions employed, care should be taken to insure that the reaction mixture is maintained in the anhydrous condition, for to the extent that water is present there is formed the conventional sulfo-carboxylic acid instead of the desired inner acid anhydride. Under anhydrous conditions the anhydride is formed in good yields, the conversion thereto generally being in excess of 50%, based on the amount of sulfur trioxide employed.

The acid anhydrides of the present invention are useful for a number of purposes, having valuable insecticidal and plant regulatory properties, among others, for example. However, they have particular utility as intermediates in the preparation of other products. Thus, it has been discovered that they readily combine with the various mono and polyamines (as illustrated in Example I below) to form various amino and amido products, many of which are polymeric in character, while others, on treatment with dilute caustic, provide useful detergents. It has also been found that the acid anhydrides of the present invention have the useful property of combining with olefins, or olefin derivatives, to form six-membered ring compounds. The latter reaction is illustrated in the following equation, wherein R is any alkyl or other substituent group which is free of aliphatic unsaturation:

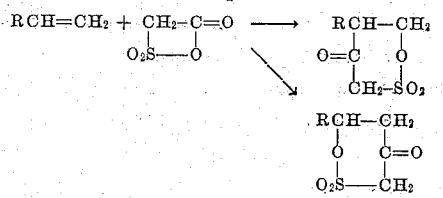

The products of the foregoing equation, on treatment with dilute caustic, in turn yield products of the type of

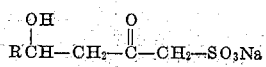

and

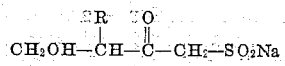

The present invention is illustrated in various of its embodiments by the following examples:

EXAMPLE I

A solution of sulfur trioxide was prepared by the drop-wise addition of 40 grams (0.5 mole) of sulfur trioxide to a stirred solution of 44 grams (0.5 mole) of dioxane in 150 ml. of ethylene chloride with cooling. Ketene ($CH_2=C=O$) was then bubbled into the solution until approximately 0.5 mole of ketene had been added, the reaction mixture being maintained at approximately 13° C. by cooling during the addition of the ketene. The reaction mixture was thereafter allowed to stand for 30 minutes at 15° C. The presence of the inner anhydride of sulfoacetic acid was then established by preparation of the known anilinium sulfoacetanilide compound the reaction proceeding in accordance with the equation:

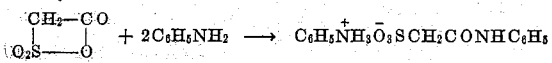

This anilinium derivative was prepared by pouring the reaction mixture into a solution of 200 g. of aniline in an equal volume of benzene with cooling, the resulting mixture then being allowed to stand in the ice box overnight. The slimy precipitate which separated as a result of this cooling step was collected on a filter and recrystallized from about two liters of absolute ethanol. The nicely crystalline derivative weighed 70 g. after it had been dried in air. The melting point, 229–231° C., was in exact agreement with that of anilinium sulfoacetanilide prepared by Stillich [J. prakt. Chem., 74, 53 (1906)] from aniline and sulfoacetic acid.

*Anilinium sulfoacetanilide*

|  | Found | Theory ($C_{14}H_{16}N_2SO_4$) |
|---|---|---|
| M. P. | 229–231° C. | 229–231° C. |
| N. | 8.86 | 9.09 |
| n. e. | 0.328 | 0.324 eq./100 g. |

The filtrate from the above recrystallization was concentrated to about 600 ml. and cooled in the ice box overnight. An additional 15 g. of less pure, M. P. 224–227° C., anilinium sulfoacetanilide separated, thus indicating at least a 58% conversion to the sulfoacetic acid inner anhydride, based on sulfur trioxide. The filtrate was concentrated to a heavy syrup which was diluted with benzene and cooled. The 13 g. of crystalline precipitate was much more soluble in alcohol than the preceding derivative. It was recrystallized from alcohol-benzene, butanol and ethanol. The melting point of the product, 181–182° C., was lower than that previously reported by Stillich (see above) for the monoanilinium salt of sulfoacetic acid (M. P. 187–188° C.). However, heating the product with aniline at 180–195° C. for forty-five minutes gave a product whose melting point, 229–231° C., and mixed melting point were in agreement with anilinium sulfoacetanilide. Formation of the monoanilinium product is doubtless attributable to minor amounts of water that unavoidably crept into the reaction mixture, thereby converting a minor percentage of the inner acid anhydride to sulfoacetic acid.

EXAMPLE II

Following the procedure outlined in the foregoing example, but with the substitution for the ketene of approximately ½ mole of methylketene, benzylketene, phenylketene and methylphenylketene, respectively, in the sulfur trioxide-containing solution, there are readily obtained the corresponding acid anhydrides, here those of alpha-sulfopropionic acid, phenyl sulfoacetic acid and alpha-phenyl-alpha-sulfopropionic acid.

Still other reactions, all of which readily go forward to produce the indicated sulfo-carboxylic acid inner anhydride, are presented in the table presented above.

The invention claimed is:
1. The process comprising bringing a ketene of the general formula

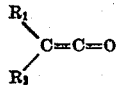

into contact with sulfur trioxide in an anhydrous, liquid reaction medium, the resulting reaction proceeding in accordance with the equation,

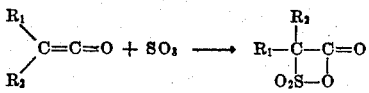

wherein $R_1$ and $R_2$ are selected from the group consisting of the hydrogen atom and the alkyl, aryl, alkaryl, aralkyl and cycloaliphatic radicals.

2. The process comprising bringing a ketene of the general formula

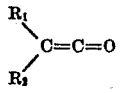

into contact with sulfur trioxide in a liquid, anhydrous reaction medium at a temperature below about 50° C., the resulting reaction proceeding in accordance with the equation,

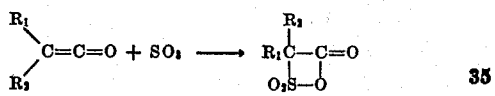

wherein $R_1$ and $R_2$ are selected from the group consisting of the hydrogen atom and the alkyl, aryl, alkaryl, aralkyl and cycloaliphatic radicals.

3. The process of producing the inner anhydride of sulfoactic acid comprising bringing ketene into contact with sulfur trioxide in an anhydrous liquid reaction medium at a temperature below 50° C.

4. A compound having the formula

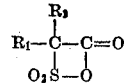

wherein $R_1$ and $R_2$ are selected from the group consisting of the hydrogen atom and the alkyl, aryl, alkaryl, aralkyl and cycloaliphatic hydrocarbon radicals.

5. The inner anhydride of sulfoacetic acid.

CURTIS W. SMITH.

REFERENCES CITED

The following references are of record in the file of this patent:

UNITED STATES PATENTS

| Number | Name | Date |
|---|---|---|
| 2,178,353 | Werntz | Oct. 31, 1939 |
| 2,411,823 | Doumani | Nov. 26, 1946 |